(12) United States Patent
Yoshida et al.

(10) Patent No.: US 9,892,559 B2
(45) Date of Patent: Feb. 13, 2018

(54) PORTABLE TERMINAL DEVICE, AND PORTABLE CONTROL DEVICE

(71) Applicant: Digital Electronics Corporation, Osaka-shi (JP)

(72) Inventors: Minoru Yoshida, Osaka (JP); Toru Terada, Osaka (JP)

(73) Assignee: Digital Electronics Corporation, Osaka-shi (JP)

( * ) Notice: Subject to any disclaimer, the term of this patent is extended or adjusted under 35 U.S.C. 154(b) by 4 days.

(21) Appl. No.: 14/677,183

(22) Filed: Apr. 2, 2015

(65) Prior Publication Data

US 2015/0379771 A1   Dec. 31, 2015

(30) Foreign Application Priority Data

Jun. 25, 2014   (JP) ................................ 2014-130699

(51) Int. Cl.
*G06T 9/00*     (2006.01)
*G06T 19/00*    (2011.01)
(Continued)

(52) U.S. Cl.
CPC ........ *G06T 19/006* (2013.01); *G06K 9/00671* (2013.01); *G06T 11/00* (2013.01);
(Continued)

(58) Field of Classification Search
CPC .............. G06T 19/006; G06K 9/00671; G09G 2340/12
(Continued)

(56) References Cited

U.S. PATENT DOCUMENTS 7,787,992 B2 *   8/2010   Pretlove ................. G06F 3/011
                                                            700/259
2007/0208435 A1   9/2007   Schott
(Continued)

FOREIGN PATENT DOCUMENTS

EP        1832944 A1    9/2007
JP     2012-156737 A    8/2012
JP     2014-099025 A    5/2014

OTHER PUBLICATIONS

Search Report dated Dec. 10, 2015, issued for the European patent application No. 15160220.8.
(Continued)

*Primary Examiner* — Yuehan Wang
(74) *Attorney, Agent, or Firm* — Locke Lord LLP

(57) ABSTRACT

A PC includes: an image data setting section for (i) setting, to background image data indicative of a background image, apparatus image data obtained by capturing an image of an apparatus and serving as referential image data to be referred to for identifying the apparatus, and (ii) setting, to the apparatus image data, dynamic part image data indicative of a dynamic part image positioned on the apparatus image; and an address setting section for (i) associating, with the dynamic part image data, (a) an address for specifying a storage area of a memory in which storage area data to be accessed by a portable terminal device is stored and (b) address substitutive information to be substituted for the address, and (ii) generating address display data to be used to display the address substitutive information instead of the address.

2 Claims, 6 Drawing Sheets

(51) Int. Cl.
*G06T 11/60* (2006.01)
*G06K 9/00* (2006.01)
*G09G 5/00* (2006.01)
*G06T 11/00* (2006.01)

(52) U.S. Cl.
CPC .............. *G06T 11/60* (2013.01); *G09G 5/003* (2013.01); *G09G 2340/12* (2013.01)

(58) Field of Classification Search
USPC ........................................................ 345/633
See application file for complete search history.

(56) References Cited

U.S. PATENT DOCUMENTS

2007/0279244 A1* 12/2007 Haughawout .......... G08C 19/28
340/4.31
2013/0069985 A1* 3/2013 Wong ................... G02B 27/017
345/633

OTHER PUBLICATIONS

Zhu Jiang, "A Novel Augmented Reality Based System for Providing Maintenance Assistance—Chapter 4 Online Authoring for AR-based Remote Maintenance," NUS Graduate School for Integrative Sciences and Engineering, National University of Singapore 2013, pp. 37-47.
Gerrit Meixner et al., "User Interaction Evolution in the SmartFactory", the Authors, 2010, pp. 211-220.

* cited by examiner

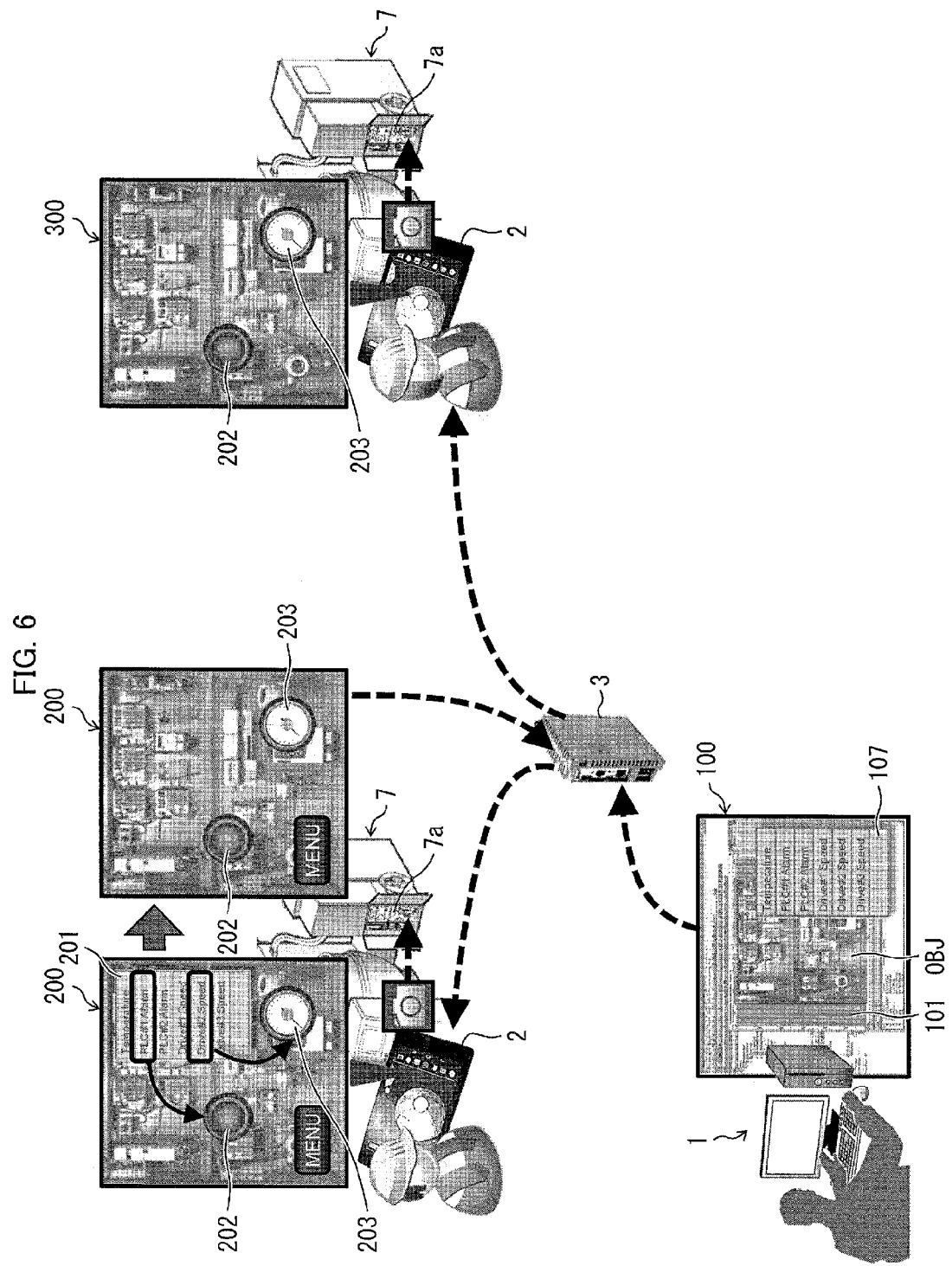

PORTABLE TERMINAL DEVICE, AND PORTABLE CONTROL DEVICE

This Nonprovisional application claims priority under 35 U.S.C. §119 on Patent Application No. 2014-130699 filed in Japan on Jun. 25, 2014, the entire contents of which are hereby incorporated by reference.

TECHNICAL FIELD

The present invention relates to an image data generating device for generating image data to be used to generate an interface image that is to be displayed, as an interface to an apparatus, on a portable terminal device, and also relates to a portable terminal device for generating the interface image by using the image data.

BACKGROUND ART

In factories etc., conditions of apparatuses are monitored for the purpose of maintaining smooth operations of the apparatuses. For example, in a case where a monitored apparatus is connected with a PLC (Programmable Logic Controller), it is possible to check a condition of the apparatus by causing a display device such as a programmable display device to display an error or trouble of the apparatus which is written in a memory of the PLC.

Furthermore, an application of a technique of Augmented Reality (AR) to such monitoring of an apparatus is being progressed. For example, Patent Literature 1 describes generating notification information based on captured image information obtained as a result of an information processing terminal capturing a sensor node to which an AR marker is attached, and displaying the notification information after combining the notification information with the captured image information. By using this technique, it is possible to know a condition of an apparatus in the form of notification information only by capturing an image of the apparatus.

CITATION LIST

Patent Literatures

[Patent Literature 1]
Japanese Patent Application Publication, Tokukai, No. 2012-156737 (Published on Aug. 16, 2012)

SUMMARY OF INVENTION

Technical Problem

A customized image is required for monitoring and/or operating an apparatus with use of a programmable display device etc. Such an image is created by a user using customized image creating software. However, since such an image is created beforehand by an image creator in consideration of an operation of the apparatus, the image contains unnecessary information, and/or the like, and so is not necessarily easy to use for an on-site worker who uses the image for the purpose of maintenance etc.

Furthermore, with recent prevalence of portable terminal devices such as tablet terminals, it is increasingly requested to use such portable terminal devices not only for monitoring an apparatus but also for operating the apparatus. However, in order that a portable terminal device can realize a function similar to that of a programmable display device, it is necessary to provide the portable terminal device with an image which is similar to an image displayed by the programmable display device and which is suitable for the portable terminal device. In this case, the image is not different in contents from the image displayed by the programmable display device, and so the image is also not necessarily easy to use for an on-site worker.

On the other hand, the system described in Patent Literature 1 uses a portable information processing terminal and so can obtain a condition of an apparatus based on a result of directly capturing an image of the apparatus. However, it is considered that in the system, notification information has predetermined contents and a predetermined display form. Accordingly, in the system, it is impossible to appropriately select information required by a user and cause the information to be displayed at a desired position. For this reason, in order to identify a malfunctioning part etc., it is necessary for a user to resort to his/her memory and/or read a reference in order to know a relation between information and an actual apparatus.

Furthermore, development of application software using an AR technique requires not only a programming technique using an advanced computer language but also a technique of a mutual exchange between the apparatus and the portable terminal device. Accordingly, a staff for development of the application software is required to have various techniques.

The present invention is made in view of the foregoing problems. An object of the present invention is to allow a user who does not have a programming technique using an advanced computer language to freely generate, on a portable terminal device, HMI (Human Machine Interface) using an AR technique.

Solution to Problem

In order to solve the foregoing problems, an image data generating device of the present invention includes: an image setting section for (i) setting apparatus image data indicative of an apparatus image to background image data indicative of a background image which serves as a background on which the apparatus image is provided, the apparatus image data being obtained by capturing an image of an apparatus and serving as referential image data indicative of a referential image to be referred to for identifying the apparatus, and (ii) setting dynamic part image data indicative of a dynamic part image to the referential image data, together with a specified position of the dynamic part image in the referential image data, the dynamic part image being positioned on the apparatus image and displayed in a dynamically changing state; and an address setting section for (i) associating, with the dynamic part image data, (a) an address for specifying a storage area of a memory in which storage area control data is stored, the control data being accessed by a portable control device that is for monitoring and operating the apparatus and (b) address substitutive information to be substituted for the address, and (ii) generating address display data to be used to display the address substitutive information instead of the address.

Advantageous Effects of Invention

The present invention with the aforementioned configuration allows a user who does not have a programming technique using an advanced computer language to freely generate, on a portable terminal device, HMI (Human Machine Interface) using an AR technique.

BRIEF DESCRIPTION OF DRAWINGS

FIG. 6 is a drawing illustrating an embodiment of usage of the display data generating system and the control system.

DESCRIPTION OF EMBODIMENTS

Embodiment

The following description will discuss one embodiment of the present invention with references to FIGS. 1 through 6.

Figure 1:
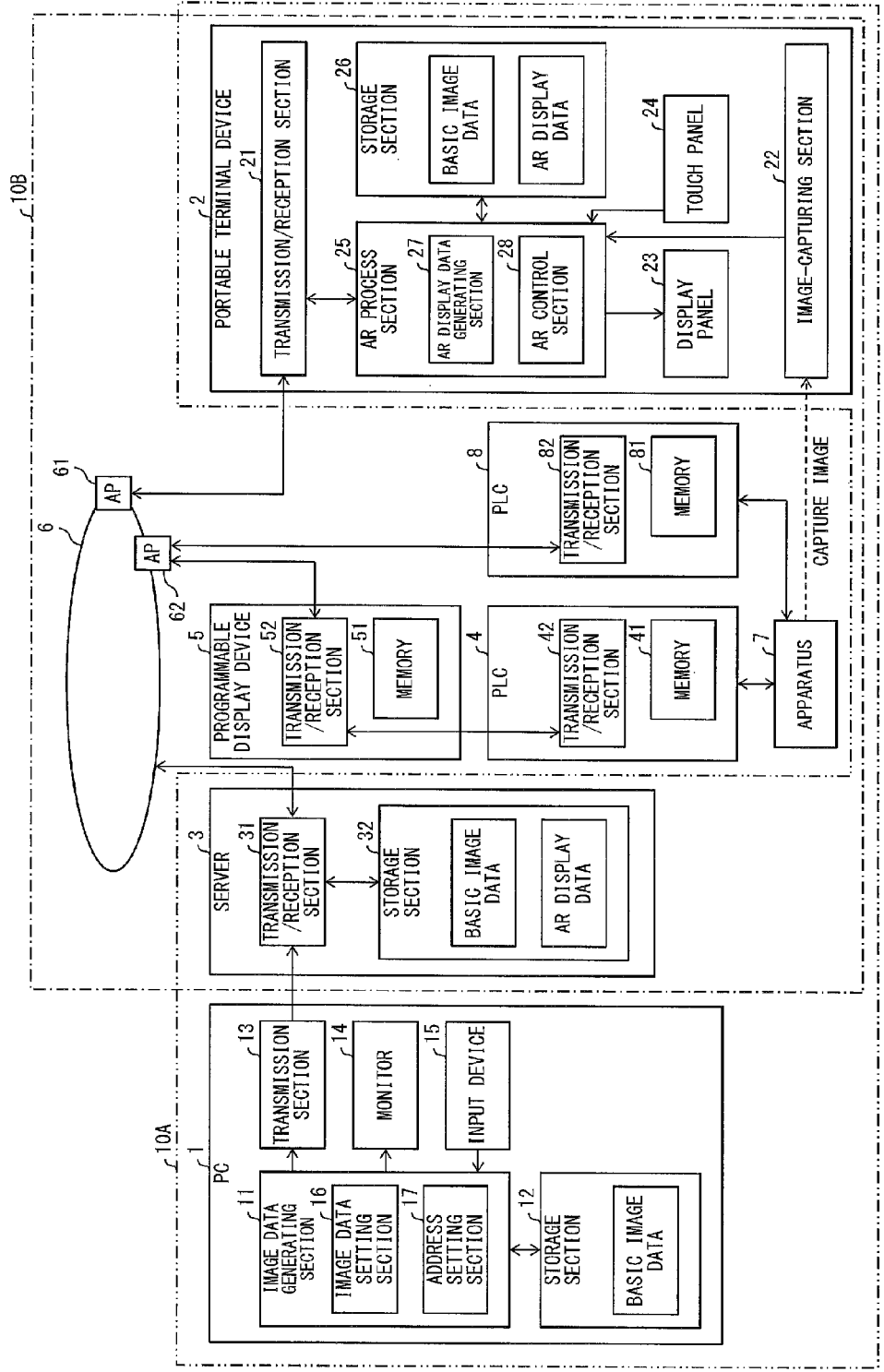
FIG. 1 is a block diagram illustrating configurations of a display data generating system and a control system in accordance with one embodiment and another embodiment of the present invention.

FIG. 1 is a block diagram illustrating configurations of a display data generating system 10A and a control system 10B in accordance with the present embodiment.

As illustrated in FIG. 1, the display data generating system 10A includes: a personal computer (referred to as "PC" in the drawing) 1 for generating basic image data to be supplied to a portable terminal device 2; the portable terminal device 2 for generating AR (Augmented Reality) display data based on the basic image data and performing AR display; and a server 3 in which the basic image data and the AR display data are stored. The basic image data is data which is indicative of a basic image and which includes basic information for generating the AR display data by the portable terminal device 2, thereby serving as a basis for generating the AR display data. The AR display data is data with use of which the portable terminal device 2 performs AR display. The basic image data and the AR display data will be detailed later together with generation thereof.

On the other hand, the control system 10B includes: a PLC 4 serving as a control device; a programmable display device 5 serving as an operation and display terminal for the PLC 4; a wireless network 6 via which the PLC 4 and the programmable display device 5 are wirelessly connected with the portable terminal device 2; and an apparatus 7 to be controlled by the PLC 4. The control system 10B further includes the server 3 and the portable terminal device 2 that realizes an interface with the apparatus 7 by using AR display data supplied from the server 3. The programmable display device 5 is communicably connected with the PC 1 and the PLC 4.

First, a description will be provided below as to (i) the PC 1 which is a part of the display data generating system 10A and (ii) the portable terminal device 2 and the server 3 which constitute parts of each of the display data generating system 10A and the control system 10B. As described later, the portable terminal device 2 and the server 3 are used in generating AR display data and so are included in the display data generating system 10A, while the portable terminal device 2 and the server 3 are also used for accessing control data by designating an address with use of AR display data and so are also included in the control system 10B.

The personal computer (hereinafter simply referred to as "PC") 1 is a general-purpose computer which includes a CPU, a memory, a storage device (such as HDD and SSD), a communication interface, etc., and on which an OS (Operating System) is mounted. Furthermore, the PC 1 (image data generating device) includes an image data generating section 11 for generating basic image data, a storage section 12 in which the basic image data is stored, a transmission section 13 for transmitting the basic image data from the storage section 12 to the server 3, a monitor 14 for display, and an input device 15 via which an input operation is made.

The image data generating section 11 generates basic image data. In order to generate the basic image data, the image data generating section 11 includes an image data setting section 16 for setting data (apparatus image data) indicative of an image (apparatus image) obtained by capturing an image of the apparatus 7 and dynamic part image data (mentioned later) to background image data (mentioned later), and an address setting section 17 for setting an address associated with the dynamic part image data thus set.

The image data setting section 16 (image setting section) sets at least one piece of apparatus image data selected from preregistered apparatus image data, to data (background image data) indicative of a background image that becomes a base (background). Furthermore, the image data setting section 16 sets, to the apparatus image data, at least one piece of data (dynamic part image data) indicative of an image (dynamic part image) of a part to be provided on the apparatus image. The dynamic part image shows a part (such as a switch, lamp, or meter) having a specific function, and dynamically changes its state of display.

The address setting section 17 sets, for each piece of the part image data set to the apparatus image data, (i) an address in a memory 41 (mentioned later) of the PLC 4 or a memory 51 (mentioned later) of the programmable display device 5 and (ii) address substitutive information. The address substitutive information is information that is presented to a user instead of the address so as to allow the user to easily recognize (understand) the address, and that is given to the address. The address substitutive information is information prepared in a form that allows a user to easily recognize the information, such as comments on control data stored in a storage area specified by an address and a name of a target (e.g. temperature of a tank) of control by the control data. The address setting section 17 not only sets the address and the address substitutive information for the part image data but also generates address display data for causing the portable terminal device 2 to display a list of the address and the address substitutive information associated with the address.

The address setting section 17 allows setting a plurality of pieces of dynamic part image data with respect to one address. Consequently, as mentioned later, when AR display data is generated in the portable terminal device 2, it is possible to select, for the selected one address, one of the plurality of pieces of dynamic part image data.

Next, a description will be provided below as to the portable terminal device 2.

The portable terminal device 2 is a terminal device such as a tablet terminal, having, as basic functions, a wireless communication function, an image-capturing function, a display function, and an input function. In order to realize these basic functions, the portable terminal device 2 includes a transmission and reception section 21 which wirelessly communicates with the server 3 via the wireless network 6, an image-capturing section 22 for capturing an image of an object, a display panel 23 for displaying an image, and a touch panel 24 for receiving a touch input on the display panel 23.

Furthermore, when capturing an image of the apparatus 7, the portable terminal device 2 accesses, with use of AR display, data indicative of the apparatus 7 which data is stored in the PLC 4 and the programmable display device 5. The portable terminal device 2 also generates, based on the basic image data, AR display data for the AR display. In order to perform the AR display and generate the AR display data, the portable terminal device 2 includes an AR process section 25 and a storage section 26.

The AR process section 25 includes an AR display data generating section 27 for generating AR display data, and an AR control section 28 for performing AR display based on the AR display data.

The AR display data generating section 27 generates AR display data based on (i) basic image data stored in the server 3 and (ii) captured image data obtained as a result of the image-capturing section 22 capturing an image of the apparatus 7.

Specifically, when the AR display data generating section 27 (address substitutive information display process section) recognizes, on the basis of the captured image data, an image of the apparatus 7 is being captured, the AR display data generating section 27 performs, in accordance with address display data included in the basic image data, a display process for displaying a list of address substitutive information on the image (actual image) of the apparatus 7 thus captured. Thereby, the AR display data generating section 27 causes the display panel 23 to display the actual image and the list of address substitutive information. Further, the AR display data generating section 27 (part image list display process section) causes the display panel 23 to display a list of a dynamic part image(s) corresponding to the address substitutive information selected by a user from the list of address substitutive information. Furthermore, the AR display data generating section 27 (part image setting section) causes the dynamic part image selected from the list of the dynamic part image(s) to be displayed at a set position on the actual image. The AR display data generating section 27 also communicates with a device having a memory specified by an address corresponding to the dynamic part image, so as to generate AR display data to which dynamic part image data is set. The dynamic part image data set here to this AR display data is dynamic part image data indicative of the dynamic part image corresponding to an address with which control data could be accessed in the above communication.

When the AR control section 28 (part image display process section) recognizes, on the basis of the captured-image data, the image of the apparatus 7 is being captured, the AR control section 28 causes, in accordance with the dynamic part image data set to the generated AR display data, the dynamic part image thus set to be displayed at a set position on the actual image of the apparatus 7 which is being displayed on the display panel 23. Furthermore, when the touch panel 24 detects a touch on the displayed dynamic part image, the AR control section 28 (data access section) communicates with the PLC 4 or the programmable display device 5 so as to access control data by designating an address corresponding to the dynamic part image. This control data is data specified by the address and stored in the storage area of the memory 41, the memory 51, or the like.

The storage section 26 is provided for temporarily storing AR display data generated by the AR display data generating section 27. Furthermore, the storage section 26 is provided for storing AR display data read from the server 3 when the AR control section 28 carries out processing.

Next, a description will be provided below as to the server 3.

The server 3 is a server computer in which basic image data generated by the PC 1 and AR display data generated by the portable terminal device 2 are stored. The server 3 includes a transmission and reception section 31 for communicating with the PC 1 and the portable terminal device 2, and a storage section 32 in which the basic image data and the AR display data are stored. The transmission and reception section 31 has a wireless communication function (e.g. wireless LAN communication function) for the purpose of wirelessly communicating with the portable terminal device 2. Alternatively, for this purpose, the transmission and reception section 31 may be connected with a wireless communication device (e.g. wireless LAN router) or configured to be communicably connectable with the wireless network 6.

Next, a description will be provided below as to the PLC 4 and the programmable display device 5.

The PLC 4 is a control device for controlling the apparatus 7 which is a control target, in accordance with a logic program specifying an operation of the apparatus 7. Furthermore, the PLC 4 includes the memory 41 in which control data for various devices (output devices such as a motor and input devices such as a sensor) in the apparatus 7 are stored.

The programmable display device 5 is a dedicated computer exclusively serving as a terminal for operation and display of the PLC 4, and is preferably used as an HMI (Human Machine Interface) device. Furthermore, the programmable display device 5 includes the memory 51 in which control data generated as a result of an operation on the programmable display device 5, control data obtained from the PLC 4 and other devices connected with the programmable display device 5, and the like data are stored.

The programmable display device 5 includes a transmission and reception section 52 having a wireless communication function, and can communicate with the portable terminal device 2 via the wireless network 6. Since the PLC 4 includes the transmission and reception section 42, the PLC 4 can communicate with the programmable display device 5, so that the PLC 4 can exchange control data with the portable terminal device 2 via the programmable display device 5. The control system 10B includes a PLC 8 including a transmission and reception section 82 connectable with the wireless network 6. The PLC 8 is configured to directly communicate with the portable terminal device 2. Alternatively, the PLC 4 and the programmable display device 5 are connected with a wireless communication device (e.g. wireless LAN router) instead of having a wireless communication function.

The wireless network 6 is a wireless communication network such as a wireless LAN. The wireless network 6 includes access points (indicated by "AP" in FIGS. 1) 61 and 62. The access point 61 is located in a communication area of the portable terminal device 2, and the access point 62 is located in a communication area of the PLC 4 and the programmable display device 5.

The following description will discuss an operation of generating basic image data by the PC 1 in the display data generating system 10A configured as above, an operation of generating AR display data by the portable terminal device 2 in the display data generating system 10A, and an operation of the control system 10B.

FIGS. 2 to 5 are drawings illustrating individual steps in generation of basic image data by the PC 1. FIG. 6 is a drawing illustrating an embodiment of usage of the display data generating system 10A and the control system 10B.

First, a description will be provided below as to the operation of generating basic image data by the PC 1.

Figure 2:
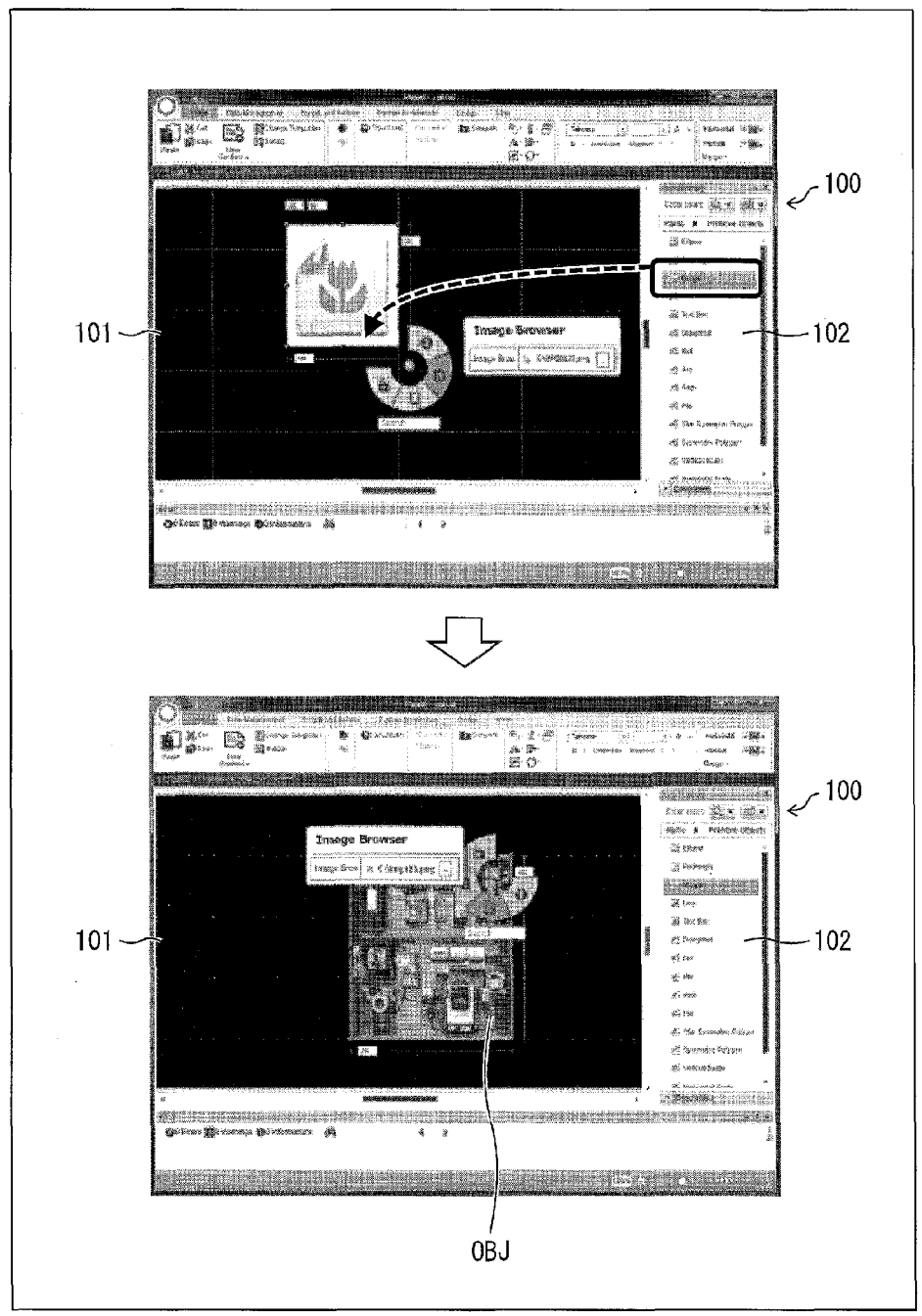
FIG. 2 is a drawing illustrating the step of providing an apparatus image among the steps in generation of basic image data on a personal computer in the display data generating system.

As illustrated in FIG. 2, the image data setting section 16 in the image data generating section 11 causes the monitor 14 to display an image generating window 100 as a GUI (Graphical User Interface). The image generating window 100 has a background image display area 101 that is a single-color area, for displaying the aforementioned background image, and a library area 102 for displaying preregistered icons of an apparatus image and a dynamic part image.

As illustrated in FIG. 2, using the input device 15, a user drags, from the library area 102, an icon indicative of an apparatus image OBJ of part (part to be monitored) of the apparatus 7, and drops the icon at a desired position in the background image display area 101. In response to this operation, the image data setting section 16 causes the apparatus image OBJ to be displayed as an object on the background image display area 101.

Figure 3:
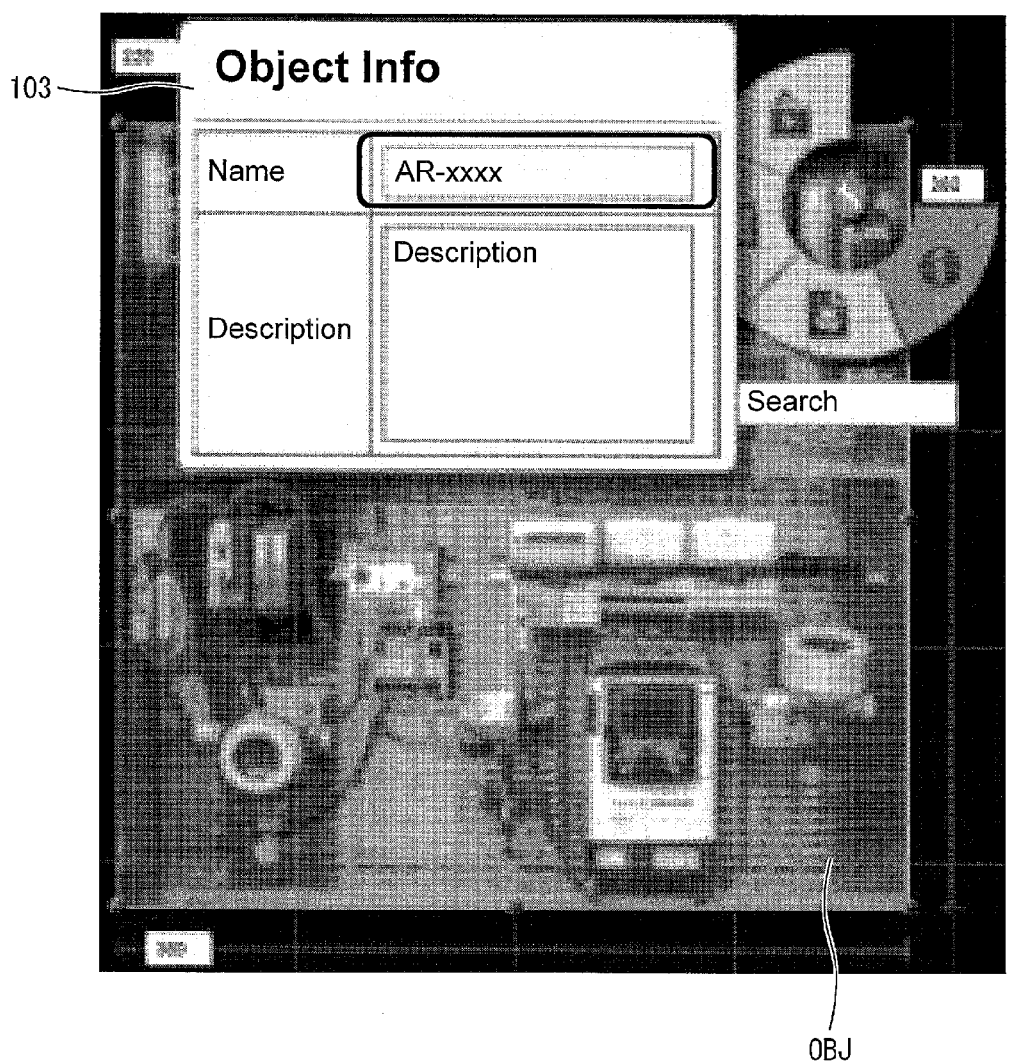
FIG. 3 is a drawing illustrating the step of setting an object name for thus provided apparatus image among the steps in generation of basic image data.

In this state, the image data setting section 16 causes an object information input window 103 to be displayed on the apparatus image OBJ (see FIG. 3). The object information input window 103 receives a user's input of an object name which has a predetermined prefix and which is unique to the apparatus image OBJ. The prefix is for identifying the kind of an object. For example, "AR" is used for an object used for AR display, such as the apparatus image OBJ. The image data setting section 16 sets, for the apparatus image OBJ, the object name inputted to the object information input window 103.

Although not illustrated, in a case where an apparatus image OBJ indicating a whole of the apparatus 7 is used but an object to be monitored and subjected to AR display is part of the apparatus 7, it is necessary to specify a place where the part is to be presented. Accordingly, when a dynamic part image having a rectangular shape is dragged from the library area 102 and dropped on the background image display area 101 so as to be provided at the place, the image data setting section 16 sets the place as a portion where AR display is to be carried out.

Figure 4:
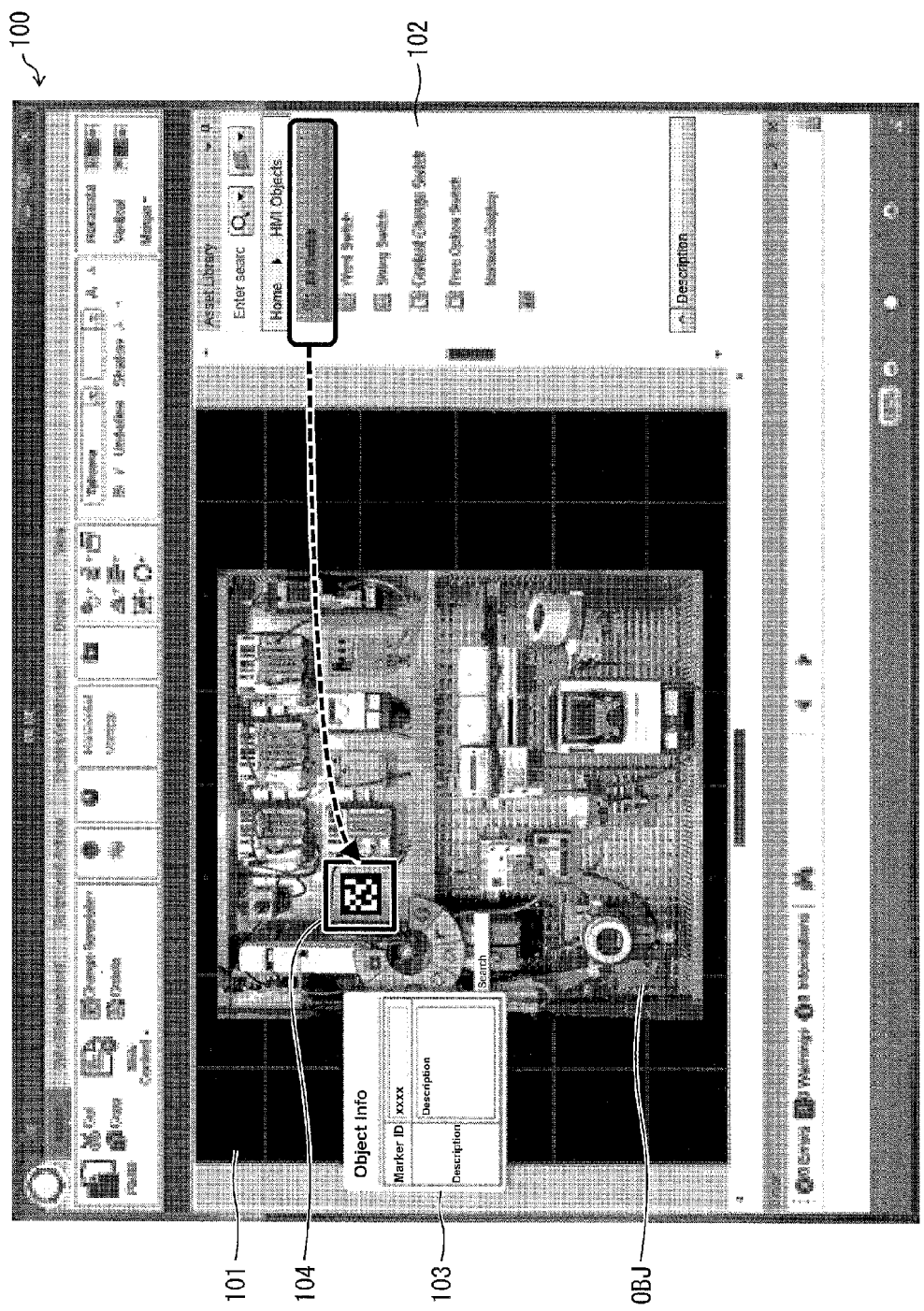
FIG. 4 is a drawing illustrating the step of providing a marker on the apparatus image among the steps in generation of basic image data.

If necessary, as illustrated in FIG. 4, a marker image 104 which is an image of a marker is positioned at a user's desired location, by an operation of dragging an icon from the library area 102 and dropping the icon on the background image display area 101. In response to this operation, the image data setting section 16 sets the marker image 104 as a portion recognized as a marker. Furthermore, the image data setting section 16 causes the object information input window 103 for the marker image 104 to be displayed on the apparatus image OBJ, and sets, for the marker image 104, a marker ID inputted by a user via the object information input window 103.

Figure 5:
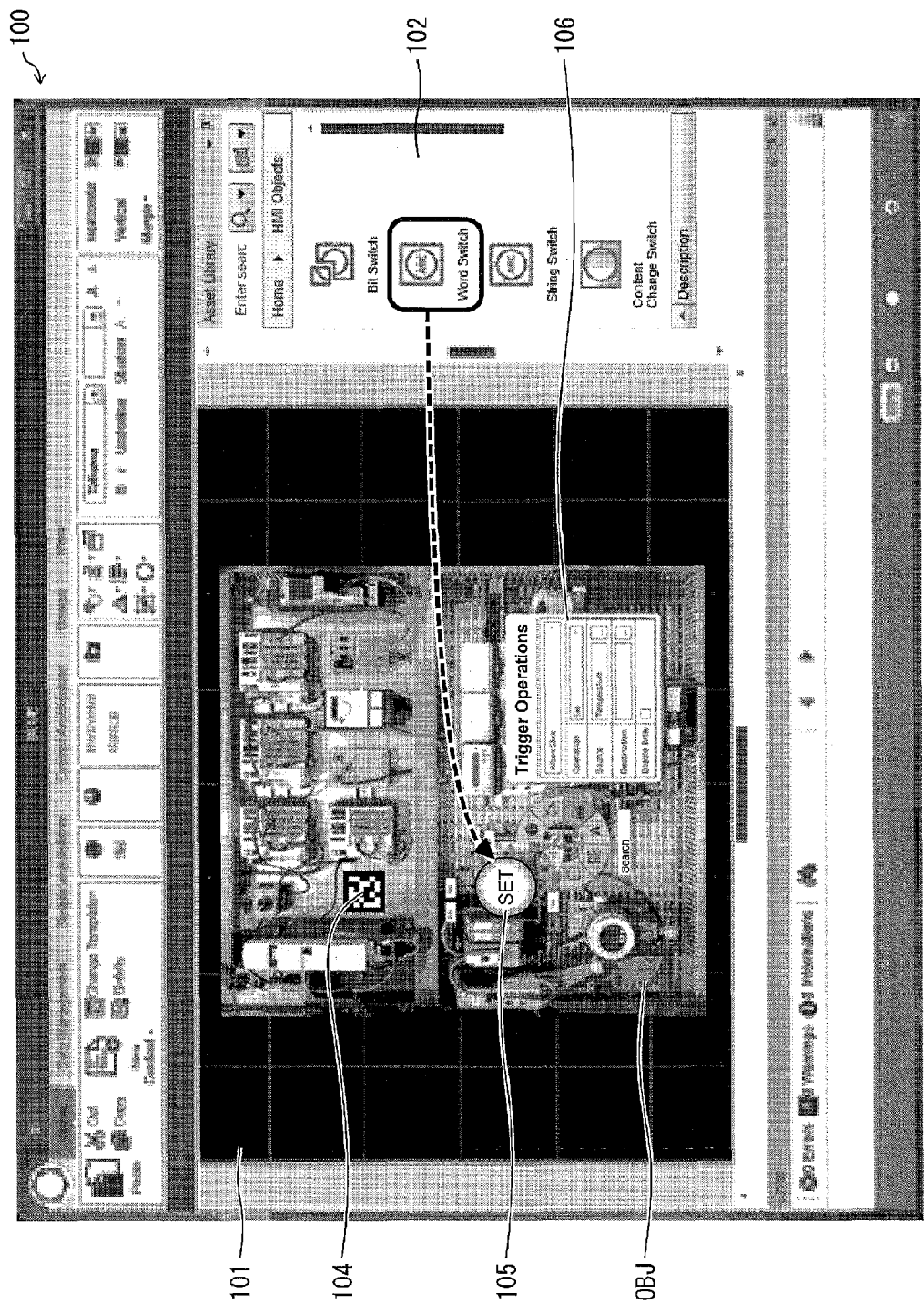
FIG. 5 is a drawing illustrating the step of providing a part image on the apparatus image among the steps in generation of basic image data.

Next, as illustrated in FIG. 5, a dynamic part image 105 is positioned at a user's desired location, by an operation of dragging an icon from the library area 102 and dropping the icon on the background image display area 101. In response to this operation, the image data setting section 16 sets, for the apparatus image OBJ, dynamic part image data indicative of the dynamic part image as well as a position of the dynamic part image. Furthermore, the image data setting section 16 causes an attribute input window 106 for the dynamic part image 105 to be displayed on the apparatus image OBJ, and sets, for the dynamic part image 105, various attributes which have been inputted in regard to the dynamic part image 105 by a user via the attribute input window 106.

Although not illustrated, the address setting section 17 causes an address setting window for setting an address for the dynamic part image 105 (dynamic part image data) to be displayed on the apparatus image OBJ, and sets, for the dynamic part image data, an address inputted by a user via the address setting window. Specifically, the address setting section 17 sets, for the dynamic part image data, the address inputted by a user for the dynamic part image data and address substitutive information corresponding to the address. Setting only an address for the dynamic part image data would not allow a user who wants to select an address on the portable terminal device 2 to easily recognize the kind of data to be accessed. Accordingly, by setting the address substitutive information as well as the address for the dynamic part image data, it is possible to give address substitutive information which allows a user who wants to select an address on the portable terminal device 2 to easily recognize the kind of data. Furthermore, by setting the address and the address substitutive information for the dynamic part image data as above, the address setting section 17 generates address display data, and causes address substitutive information to be displayed in the form of a list 107 on the apparatus image OBJ in accordance with the address display data (see FIG. 6).

When the apparatus image data and the dynamic part image data are set and an address is set for the dynamic part image data as above, the image data generating section 11 causes a background image including these settings to be stored as basic image data in the storage section 12. Furthermore, in response to a user's instruction, the image data generating section 11 reads out the basic image data from the storage section 12 and causes the transmission section 13 to transmit the basic image data to the server 3. The server 3 receives the basic image data from the PC 1 via the transmission and reception section 31, and causes the basic image data to be stored in the storage section 32.

Next, a description will be provided below as to an operation of generating AR display data (AR display data generating mode) by the portable terminal device 2.

First, in the AR display data generating mode, in response to a worker's instruction, the portable terminal device 2 downloads basic image data from the server 3 to the storage section 26. In this state, when the worker points the portable terminal device 2 (camera of the image-capturing section 22) at a targeted part 7a of the apparatus 7 in order to capture an image of the targeted part 7a, an actual image of the targeted part 7a which is being captured by the image-capturing section 22 of the portable terminal device 2 is displayed on the display panel 23 (see FIG. 6). The AR display data generating section 27 determines whether the currently displayed actual image is identical to an apparatus image (referential image) indicated by the apparatus image data, with reference to apparatus image data (referential image data) included in basic image data in the storage section 26. In this determination, the AR display data generating section 27 corrects a size and a position of the apparatus image indicated by the basic image data, with reference to positioning data included in the basic image data, and checks similarity between the actual image and the corrected apparatus image. Consequently, even when there occurs a difference in size and/or position between the actual image and the corrected apparatus image, the above correction can make the size and/or position of the apparatus image closer to those of the actual image, so that the aforementioned determination can be made easily.

In a case where the AR display data generating section 27 determines (recognizes) that the actual image is identical to the apparatus image, the AR display data generating section 27 controls the display panel 23 so that the display panel 23 displays (i) the actual image as a display image 200 which is a still image and (ii) a list 201 at a specific position on the display image 200 (see FIG. 6). The AR display data generating section 27 causes the display panel 23 to display the list 201 based on address display data included in the basic image data. The list 201 presents, in the same form as the list 107, address substitutive information as items to be selected.

When the worker touches a desired name on the list 201, the AR display data generating section 27 refers to the basic image data, obtains, from the basic image data, dynamic part image data associated with the name, and causes the display panel 23 to display a list of dynamic part images in accordance with the dynamic part image data (not illustrated). When the worker selects a desired dynamic part image from the list, the AR display data generating section 27 causes selected dynamic part images 202 and 203 to be displayed at positions on the display image 200 which positions are set in the basic image data, and causes display of the list 201 to be ended.

Normally, the AR display data generating section 27 communicates, via the wireless network 6, with all of (i) the PLC 4 including the memory 41 having storage areas one of which is designated by an address corresponding to the dynamic part image, (ii) the PLC 8 including the memory 81 similar to the memory 41, and (iii) the programmable display device 5 including the memory 51 similar to the memory 41. Alternatively, the AR display data generating section 27 may communicate, via the wireless network 6, one of the PLC 4, the PLC 8, and the programmable display device 5. Furthermore, when the AR display data generating section 27 can access control data with the address, the AR display data generating section 27 takes the dynamic part image as an effective dynamic part image, and sets the dynamic part image data and a display position of the dynamic part image to image data indicative of the display image 200. The display image 200 is an actual image displayed on the display panel 23 when the portable terminal device 2 captures an image of the targeted part 7a of the apparatus 7 (image in which the parts 202 and 203 are displayed in an augmented manner on the targeted part 7a). The AR display data generating section 27 causes the image data indicative of the display image 200 to be temporarily stored as AR display data in the storage section 26. Then, the AR display data generating section 27 reads the AR display data from the storage section 26 according to necessity, and causes the transmission and reception section 21 to transmit the AR display data to the server 3 so that the AR display data is uploaded into the server 3. Thus, the AR display data is stored in the server 3 so that the AR display data is usable by other persons.

Lastly, a description will be provided below as to an operation of the control system 10B. This operation includes an operation in monitoring and operating the apparatus 7 by the portable terminal device 2 (monitoring and operating mode).

First, in response to a worker's instruction, the portable terminal device 2 downloads AR display data from the server 3 to the storage section 26. In this state, as illustrated in FIG. 6, when the worker points the portable terminal device 2 (lens of the image-capturing section 22) at the targeted part 7a of the apparatus 7, an actual image of the targeted part 7a which is being captured by the image-capturing section 22 of the portable terminal device 2 is displayed on the display panel 23. When determining (recognizing), with reference to basic image data in the storage section 26, that the actual image is identical to the display image 200 indicated by the AR display data, the AR control section 28 causes the image of the targeted part 7a to be displayed as a display image 300 which is a still image. Furthermore, the AR control section 28 causes the dynamic part images 202 and 203 to be displayed at the same positions on the display image 300 as those on the display image 200.

Since the dynamic part image 202 is a lamp in FIG. 6, the dynamic part image 202 can indicate an operation state of a device for which the dynamic part image 202 is provided in the targeted part 7a. For example, the dynamic part image 202 lights up in green when the device is in a normal operation state, whereas the dynamic part image 202 lights up in red when the device is in an abnormal state (alarm state). The AR control section 28 obtains, from the memory 41 of the PLC 4 connected with the apparatus 7, control data (bit data) in a storage area specified by an address corresponding to the dynamic part image 202, and switches display states of the dynamic part image 202 in accordance with the control data.

On the other hand, since the dynamic part image 203 is a speed meter in FIG. 6, the dynamic part image 203 can indicate a speed (e.g. rotation speed) of a device for which the dynamic part image 203 is provided in the targeted part 7a. The AR control section 28 obtains, from the memory 41 of the PLC 4 connected with the apparatus 7, control data (numeric data) in a storage area specified by an address corresponding to the dynamic part image 203, and switches display states (meter display) of the dynamic part image 203 in accordance with the control data.

As described above, the AR control section 28 obtains control data managed in the programmable display device 5 and the PLC 4 and causes the display states of the dynamic part images 202 and 203 to reflect the control data, so that it is possible to monitor the state of the apparatus 7.

Although not illustrated, in a case where an on/off switch is displayed as a dynamic part image on the display image 300, the AR control section 28 rewrites, in the memory 41 of the PLC 4 connected with the apparatus 7, control data (bit data) in a storage area specified by an address corresponding to the dynamic part image, in accordance with an operation on the dynamic part image, and changes a display state (display of an on-state or off-state) of the dynamic part image in accordance with the control data. Thus, the AR control section 28 can make it possible to operate the apparatus 7 in a manner that requires a change of control data, by changing the control data via the dynamic part image.

Furthermore, although not illustrated, in a case where a numeric value adjuster is displayed as a dynamic part image on the display image 300, the AR control section 28 rewrites, in the memory 41 of the PLC 4 connected with the apparatus 7, control data (numeric data) in a storage area specified by an address corresponding to the dynamic part image to control data set on the dynamic part image. Thus, the AR control section 28 can make it possible to operate the apparatus 7 in a manner that requires a change of control data, by changing the control data using the dynamic part image.

Furthermore, in a case where a marker image corresponding to the aforementioned marker image 104 (see FIG. 4) is displayed on the display image 300, the AR control section 28 having recognized the marker image causes predetermined additional information to be displayed at a position of the marker image. The additional information is stored in the storage section 26 of the portable terminal device 2. Alternatively, the additional information is stored in a device such as the server 3 which is wirelessly communicable with the portable terminal device 2 via the wireless network 6. However, the additional information is basically stored in the server 3.

As described above, in the display data generating system 10A in accordance with the present embodiment, the PC 1 includes the image data generating section 11, and the portable terminal device 2 includes the AR display data generating section 27 for executing the operation of the AR data generating mode. Accordingly, the PC 1 generates beforehand basic image data including data of an apparatus image detectable by the AR control section 28 and a correspondence between a dynamic part image and an address, and then, the portable terminal device 2, in the AR display data generating mode, generates AR display data for AR display with reference to the basic image data. Therefore, a worker is only required to select, via the portable terminal device 2, a desired dynamic part image out of dynamic part images having been prepared beforehand, in order to generate AR display data with use of which control data specified by the address can be accessed.

In the control system 10B in accordance with the present embodiment, the portable terminal device 2 includes the AR control section 28 for executing the operation of the AR monitoring and operating mode. Consequently, in the AR monitoring and operating mode, a worker communicates with the PLC 4 and/or the programmable display device 5 by using generated AR display data, so that the worker can access, via the portable terminal device 2, data in a storage area specified by an address in the memory 41 or the memory 51. Since the worker operates the portable terminal device 2 while seeing the apparatus 7, it seems to the worker as if data were directly transmitted to the portable terminal device 2 from the apparatus 7. This allows the worker to make a more intuitive operation.

The basic image data and the AR display data are stored in the server 3. Accordingly, even in a case where a creator of the basic image data, a creator of the AR display data, and a user of the AR display data are different from one another, the basic image data and the AR display data can be used as a common resource in the server 3.

In the AR monitoring and operating mode, since the portable terminal device 2 refers to an actual image of the apparatus 7 (e.g. targeted part 7*a*), it is possible to identify a malfunctioning part of the apparatus 7 etc. only by pointing the portable terminal device 2 at the apparatus 7. The malfunctioning part would be more easily found when the part is indicated with emphasis than when the part is indicated by a name of the part.

For example, when bit data in a storage area specified by a certain address is put in an on-state, a specific part associated with the address is indicated with a pale red screen or a fringe. For this purpose, these display forms are prepared as dynamic part images. Furthermore, as for disconnection of a wire, a position of the disconnection can be easily checked by indicating a disconnected part of the wire in red, based on a dynamic part image of the wire prepared beforehand. In contrast, in a conventional art, a wire is given a number and/or a name. Then, when the wire is disconnected, the number and/or the name is displayed to inform a worker, a manager etc. of the disconnection, and the worker, the manager etc. is required to find out a position of the disconnected wire based on the number and/or the name.

As described above, the portable terminal device 2 accesses control data specified by a certain address with reference to an actual image of the apparatus 7, and accordingly the control system 10B is suitable for on-demand use at the time when a trouble occurs.

In a conventional art, application of AR is possible only by a high-level engineer who can make full use of an engine for analyzing image information, can configure data to be superimposed on a captured image, and can generate condition information for AR display. In contrast, in the display data generating system 10A and the control system 10B in accordance with the present embodiment, since address display data generated beforehand by the PC 1 is used, a user who does not have a programming technique based on an advanced computer language can generate AR display data, and it is possible to carry out monitoring and operation on the basis of an image displayed by using the AR display data. Since the portable terminal device 2 communicates with the PLC 4 and the programmable display device 5 in which data is stored, association of the control data stored in the PLC 4 and the programmable display device 5 with a dynamic part image via an address allows displaying a dynamic part image as augmented information on a captured image.

[Software Implementation Example]

The image data generating section 11 of the PC 1 and the AR process section 25 of the portable terminal device 2 are realized by software as executed by a CPU. Alternatively, the image data generating section 11 and the AR process section 25 are realized by a logic circuit (hardware) provided in an integrated circuit (IC chip) or the like.

In the former case, each of the PC 1 and the portable terminal device 2 includes: a CPU that executes instructions of a program that is software realizing the foregoing functions; a ROM (Read Only Memory) or a storage device (each referred to as "storage medium") storing the program and various kinds of data in such a form that they are readable by a computer (or a CPU); and a RAM (Random Access Memory) that loads the program in executable form. The object of the present invention can be achieved by a computer (or a CPU) reading and executing the program stored in the RAM. The storage medium may be "a non-transitory tangible medium". Alternatively, the program is supplied to or made available to the PC 1 and the portable terminal device 2 via any transmission medium (such as a communication network) which is capable of transmitting the program. Note that the present invention can also be implemented by the program in the form of a computer data signal embedded in a carrier wave which is embodied by electronic transmission.

In particular, since a program for realizing the AR process section 25 is installed onto the portable terminal device 2 such as a tablet terminal, it is preferable that the program is available from a general site etc. which supplies an application program. Furthermore, basic image data including address display data, the program for realizing the AR process section 25, etc. each are stored in any one of devices having a transmission and reception function, such as the PC 1, the server 3, and the programmable display device 5, connected with one wireless network 6. This is because the basic image data, the program, etc. each may be dynamically installed to the portable terminal device 2 according to necessity. On the other hand, the basic image data including address display data, the program for realizing the AR process section 25, etc. has been transferred to the portable terminal device 2 and installed therein beforehand.

Other Embodiments

A description will be provided below as to another embodiment of the present invention with reference to FIG. 1.

As illustrated in FIG. 1, the PC 1 (image data generating device in accordance with the present embodiment includes:

an image data setting section 16 (image setting section) for (i) setting apparatus image data indicative of an apparatus image to background image data indicative of a background image which serves as a background on which the apparatus image is provided, the apparatus image data being obtained by capturing an image of an apparatus 7 and serving as referential image data indicative of a referential image to be referred to for identifying the apparatus 7, and (ii) setting dynamic part image data indicative of a dynamic part image to the referential image data, together with a specified position of the dynamic part image in the referential image data, the dynamic part image being positioned on the apparatus image and displayed in a dynamically changing state; and an address setting section 17 for (i) associating, with the dynamic part image data, (a) an address for specifying a storage area of a memory 41, 51, or 81 in which storage area control data is stored, the control data being accessed by a portable control device (portable terminal device 2) that is for monitoring and operating the apparatus 7 and (b) address substitutive information to be substituted for the address, and (ii) generating address display data to be used to display the address substitutive information instead of the address.

With the PC 1 configured as above, when it is determined with use of the AR technique whether an apparatus image (referential image) set by the image data setting section 16 is identical to an actual image of the apparatus 7 whose image is captured by the portable control device, the above referential image is used for such determination. Furthermore, the image setting section sets dynamic part image data to a specific position of referential image data. Furthermore, the address setting section 17 sets an address and address substitutive information of a storage area in which control data to be referred to and written for the dynamic part image data is stored. Furthermore, the address setting section 17 generates address display data. As above, by combining apparatus image data (referential image data), dynamic part image data, and an address (address substitutive information), it is possible to use the image data generating device as a tool for generating an interface image which makes it possible to carry out monitoring and operation and which displays a dynamic part image associated with the address on an apparatus image.

Furthermore, since the portable terminal device 2 in accordance with the present embodiment has features below, the portable terminal device 2 can generate display data.

The portable terminal device 2 in accordance with the present embodiment is the portable terminal device 2 for generating display data used for the portable control device to access the control data, the display data being generated using the referential image data, the dynamic part image data, and the address which have been set by the PC 1, including: an image-capturing section 22 for capturing an image of the apparatus 7; an address substitutive information display process section (AR display data generating section 27) for carrying out a display process for displaying the address substitutive information based on the address display data, in a case where an actual image of the apparatus 7 captured by the image-capturing section 22 is recognized as identical to the referential image; a part image list display process section (AR display data generating section 27) for carrying out a display process for displaying a list of the dynamic part image with which the address is associated, at the time when the address corresponding to the address substitutive information is selected by designating the address substitutive information displayed in the display process carried out by the address substitutive information display process section; and a part image setting section (AR display data generating section 27) for setting the dynamic part image data to the display data, in a case where the control data is obtained by designating the address associated with the dynamic part image data indicative of the dynamic part image selected from the list.

The address display data is generated beforehand by the PC 1 so that display address substitutive information is displayed at a specific position on the apparatus image. The address display data is data used to display the address substitutive information instead of an address. The address substitutive information is, for example, information such as an aforementioned comment that is added so as to allow an operator to easily understand a plurality of pieces or a single piece of control data.

Furthermore, the portable terminal device 2 includes the address substitutive information display process section, the part image list display process section, and the part image setting section. A program for realizing each of these sections and the address display data may be dynamically installed into the portable terminal device 2 according to necessity. Accordingly, the program can be stored in any of the PC 1, the server 3, the programmable display device 5, etc. which are connected to a single network and which have a transmission/reception function. The program is actually stored in one of these devices. Of course, the program for realizing each of the above sections and the address display data can be transferred to the portable terminal device 2 and stored therein beforehand.

The portable terminal device 2 including the above sections operates in a display data generating mode.

In the display data generating mode, in a case where the portable terminal device 2 captures an apparatus image and then, the address substitutive information display process section recognizes that an actual image of the apparatus 7 captured by the image-capturing section 22 of the portable terminal device 2 is identical to the apparatus image (referential image), address substitutive information is displayed at a specific position on the actual image of the apparatus 7 in accordance with address display data so that an operator can select an address. When the operator designates one piece of thus displayed address substitutive information and thereby an address corresponding to the selected piece of address substitutive information is selected, the part image list display process section causes a list of a dynamic part image(s) corresponding to the address to be displayed. When one dynamic part image is selected from the displayed list of the dynamic part image(s), the part image setting section specifies the address corresponding to the selected dynamic part image so that control data can be obtained. Then, the dynamic part image is set to display data. Thus, the portable terminal device 2 can complete display data used to access control data with which the dynamic part image is displayed dynamically.

As described above, with the portable terminal device 2 given a display data generating function which causes only address substitutive information to be displayed in accordance with address display data beforehand and which thereby allows a user to select a dynamic part image based on the address substitutive information, display data is generated. Accordingly, a user of the portable terminal device 2 can easily generate display data without being required to set apparatus image data, dynamic part image data, and an address as in the PC 1.

On the other hand, since the portable control device in accordance with the present embodiment has features below, the portable control device can have a monitoring and operating function.

The portable control device in accordance with the present embodiment is a portable control device for accessing the control data with use of the display data generated by the portable terminal device 2, including: an image-capturing section 22 for capturing an image of the apparatus 7; a part image display process section (AR control section 28) for carrying out a display process for displaying the dynamic part image on the actual image based on the dynamic part image data set to the display data, in a case where an actual image of the apparatus 7 captured by the image-capturing section 22 is recognized as identical to the referential image; and a data access section (AR control section 28) for accessing the control data corresponding to the dynamic part image displayed in the display process carried out by the part image display process section, by designating the address associated with the dynamic part image data.

The portable control device including the above sections operates in a monitoring and operating mode.

In the monitoring and operating mode, when the part image display process section recognizes that the actual image of the apparatus is identical to the apparatus image (referential image), the dynamic part image is displayed on the actual image in accordance with the generated display data (association of the address with the dynamic part image data). Furthermore, the data access section accesses the control data corresponding to the displayed dynamic part image, by designating the address associated with the dynamic part image data. Thus, an interface image for an operator can be displayed by using the display data.

The portable terminal device 2 used in the display data generating mode and the portable control device used in the monitoring and operating mode are a single portable terminal device or different portable terminal devices.

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a new technical feature may be formed by combining technical means disclosed in the embodiments.

INDUSTRIAL APPLICABILITY

The present invention can be suitably applied to generating an image for monitoring with use of a portable terminal device and to monitoring an apparatus with use of the image.

REFERENCE SIGNS LIST

1 PC (image data generating device)
2 portable terminal device (portable control device)
7 Apparatus
10A Display data generating system
10B Control system
11 Image data generating section
16 Image data setting section (image setting section)
17 Address setting section
22 Image-capturing section
27 AR display data generating section (display process section, part image list display process section, part image setting section)
28 AR control section (part image display process section, data access section)
41 Memory
51 Memory

The invention claimed is:

1. A portable terminal device for generating augmented reality display data used to display, as augmented information, at least one dynamic part image on an actual image of an apparatus so that a portable control device accesses control data, the actual image being obtained by the portable control device, the augmented reality display data being generated using referential image data, dynamic part image data, and an address which have been set by an image data generating device, the referential image data indicative of a referential image to be referred to for identifying the apparatus, the dynamic part image data indicative of the at least one dynamic part image being positioned on an apparatus image and displayed in a dynamically changing state, the apparatus image being obtained by capturing an image of the apparatus in advance, the address specifying a storage area of a memory in which storage area control data is stored, the control data being accessed by a portable control device that is for monitoring and operating the apparatus, the image data generating device comprising:
an image setting section for (i) setting apparatus image data, serving as the referential image data, indicative of the apparatus image to background image data indicative of a background image which serves as a background on which the apparatus image is provided, and (ii) setting the dynamic part image data to the referential image data, together with a specified position of the at least one dynamic part image in the referential image data; and
an address setting section for (i) associating, with the dynamic part image data, (a) the address and (b) address substitutive information to be substituted for the address, and (ii) generating address display data to be used to display the address substitutive information instead of the address, the portable terminal device comprising:
an image-capturing section for capturing an image of the apparatus;
an address substitutive information display process section for carrying out a display process for displaying the address substitutive information based on the address display data, in a case where an actual image of the apparatus captured by the image-capturing section is recognized as identical to the referential image;
a part image list display process section for carrying out a display process for displaying the at least one dynamic part image in a list form so that one of the at least one dynamic part image can be selected by an operation of the user based on the dynamic part image data, with which the address is associated, at the time when the address corresponding to the address substitutive information is selected by a user designating the address substitutive information displayed in the display process carried out by the address substitutive information display process section; and
a part image setting section for setting the dynamic part image data to the augmented reality display data, in a case where the control data is obtained by designating the address associated with dynamic part image data of the one dynamic part image selected, by the operation of the user, from the at least one dynamic part image displayed in the list form.

2. A portable control device for accessing the control data with use of the augmented reality display data generated by the portable terminal device as set forth in claim 1, comprising:

an image-capturing section for capturing an image of the apparatus;

a part image display process section for carrying out a display process for displaying the dynamic part image on the actual image based on the dynamic part image data set to the augmented reality display data, in a case where the actual image of the apparatus captured by the image-capturing section is recognized as identical to the referential image; and a data access section for accessing the control data corresponding to the dynamic part image displayed in the display process carried out by the part image display process section, by designating the address associated with the dynamic part image data.

* * * * *